United States Patent [19]

Leek

[11] Patent Number: 4,832,242

[45] Date of Patent: May 23, 1989

[54] AUTOMOBILE TRUNK ORGANIZER

[76] Inventor: Thomas R. Leek, 1876 Ford Pkwy., St. Paul, Minn. 55106

[21] Appl. No.: 106,454

[22] Filed: Oct. 9, 1987

[51] Int. Cl.⁴ .............................................. B60R 7/00
[52] U.S. Cl. ................... 224/311; 224/42.42; 224/42.46 R
[58] Field of Search .................. 224/311, 42.42, 42.43, 224/42.44, 42.46 R, 309; 296/37.1; 280/769; 206/818; 220/256, 259

[56] References Cited

U.S. PATENT DOCUMENTS

| | | | |
|---|---|---|---|
| 2,518,342 | 8/1950 | Lim | 224/42.44 X |
| 2,541,702 | 2/1951 | Katz | 224/42.42 R |
| 2,554,776 | 5/1951 | Comeau | 224/42.42 R |
| 2,568,628 | 9/1951 | Herring | 224/42.43 X |
| 2,573,102 | 10/1951 | Hennessy | 224/42.42 R |
| 2,577,263 | 12/1951 | Myers | 224/42.42 R |
| 3,209,969 | 10/1965 | Hennagin, Jr. | 224/42.42 R X |
| 3,473,680 | 10/1969 | Downer | 224/311 X |
| 4,171,078 | 10/1979 | Morgan | 224/42.46 R |

Primary Examiner—Henry J. Recla
Assistant Examiner—Linda J. Sholl
Attorney, Agent, or Firm—Lewis A. Thaxton

[57] ABSTRACT

A portable automobile trunk organizer is provided for storing, organizing and transporting jumper cables, first-aid kit, flares, motor oil, other automotive fluids, flashlight and miscellaneous tools; the trunk organizer includes a top lid which attaches to the underside of the trunk lid, and has mounts for jumper cables, first-aid kit and flares, the top lid having a pair of mating flanges for complementary alignment with the bottom tray when the trunk is closed; and the bottom tray has separate recesses for storage of opened or closed containers of motor oil, brake fluid and sundry tools, while disposed at each corner thereof, four threaded rods are situated to adjust the tray height into abutting cooperation with the top lid.

6 Claims, 4 Drawing Sheets

AUTOMOBILE TRUNK ORGANIZER

BACKGROUND OF THE INVENTION

This invention is in the field of automobile trunk organizers and the like, and is more specifically directed to a unique and convenient tray arrangement for neatly storing and transporting roadside emergency accessories.

There appears to be a growing awareness, by motorist, to carry roadside emergency accessories in their vehicles. Such awareness is almost commensurate with the wide spread popularity of the automobile itself. Automobile trunks, however, do not provide for a systematized, neat and compartmentalized arrangement of such essential items. Contrariwise, the automobile trunk seems an open invitation to many motorist, for the disarrangement of contents that must be searched out when needed the most.

The concept of adding a trunk organizer to an automobile is not new. The prior art was cognizant of such a problem many decades ago.

For example, U.S. Pat. No. 1,514,885 entitled Motor-Vehicle Trunk, issued on Nov. 11, 1924 to F. A. Bigler. The patentee describes a container, having versatile purposes in addition to a tool compartment. Bigler states that the container trunk is used in connection with a motor vehicle. As one can ascertain, a major disadvantage of the patentee's trunk resides in the impracticality of storing opened fluid material therein. Moreover, no space appears evident for the storage of such vital emergency supplies as jumper cables and first-aid kit. Contrastedly, Bigler intended that his trunk be placed outside the motor vehicle while the instant invention is guided otherwise.

It is consequently the primary object of this invention to provide a new and improved portable trunk organizer for carrying emergency roadside accessories.

It is a further object of the present invention to provide a bottom tray with recessed compartments mated with a corresponding lid mounted on the underside of the automobile trunk lid.

It is an additional object of the present invention to provide a trunk organizing unit that is suitable for storing opened or closed containers of motor oil, brake fluid, various appropriate tools, flashlight, flares, battery jumper cables and first-aid kit.

It is still another object of the present invention to provide a trunk organizing unit that remains fixed and stationary when the trunk lid is closed, the automobile is in motion, yet preventing fluid spillage from open containeres and shifting of the organizing unit within the trunk.

It is yet another object of the present invention to provide a portable lightweight trunk organizer that is easy to install in most automobile trunks, equally easy to remove therefrom when the motorist requires more trunk space, and inexpensive to manufacture using present day materials and technology.

SUMMARY OF THE INVENTION

Accordingly, the present invention has been developed with a view toward organizing a variety of automobile accessories and emergency equipment in such a fashion that the items are readily accessible for inspection and use, within an automobile trunk. The present invention enables the motorist to neatly and systematically fit accessories and emergency equipment into the automobile trunk and utilize space that would otherwise be wasted.

To this end, the present invention provides an automobile trunk organizer that is constructed of two separate, but cooperating members; a rectangular top member that attaches, by means of a rectangular/magnetic strip, to the underside of the trunk lik and a rectangular bottom tray member that elevationally and adjustably fits inside the trunk bed. The top member is adapted to secure a set of jumper cables, flares and a first-aid kit, while the tray member which consists of several compartments is adapted to hold containers of motor oils, brake fluid, solvents, tools, flashlight, rags, etc. The present invention permits the motorist to store a larger number of accessories in an organized manner.

The top lid and bottom tray are formed of epoxy fiberglass or plastic as desired. Equipment attaching means, e.g. hooks, fixtures, etc. are similarly formed of fiberglass, plastic or metal. The compartments are, in like manner, molded of plastic or metal as preferred.

A better understanding of the subject invention will be enabled when the following written description is read in conjunction with the appended drawings in which.

DETAILED DESCRIPTION OF THE EMBODIMENT

Figure 1:
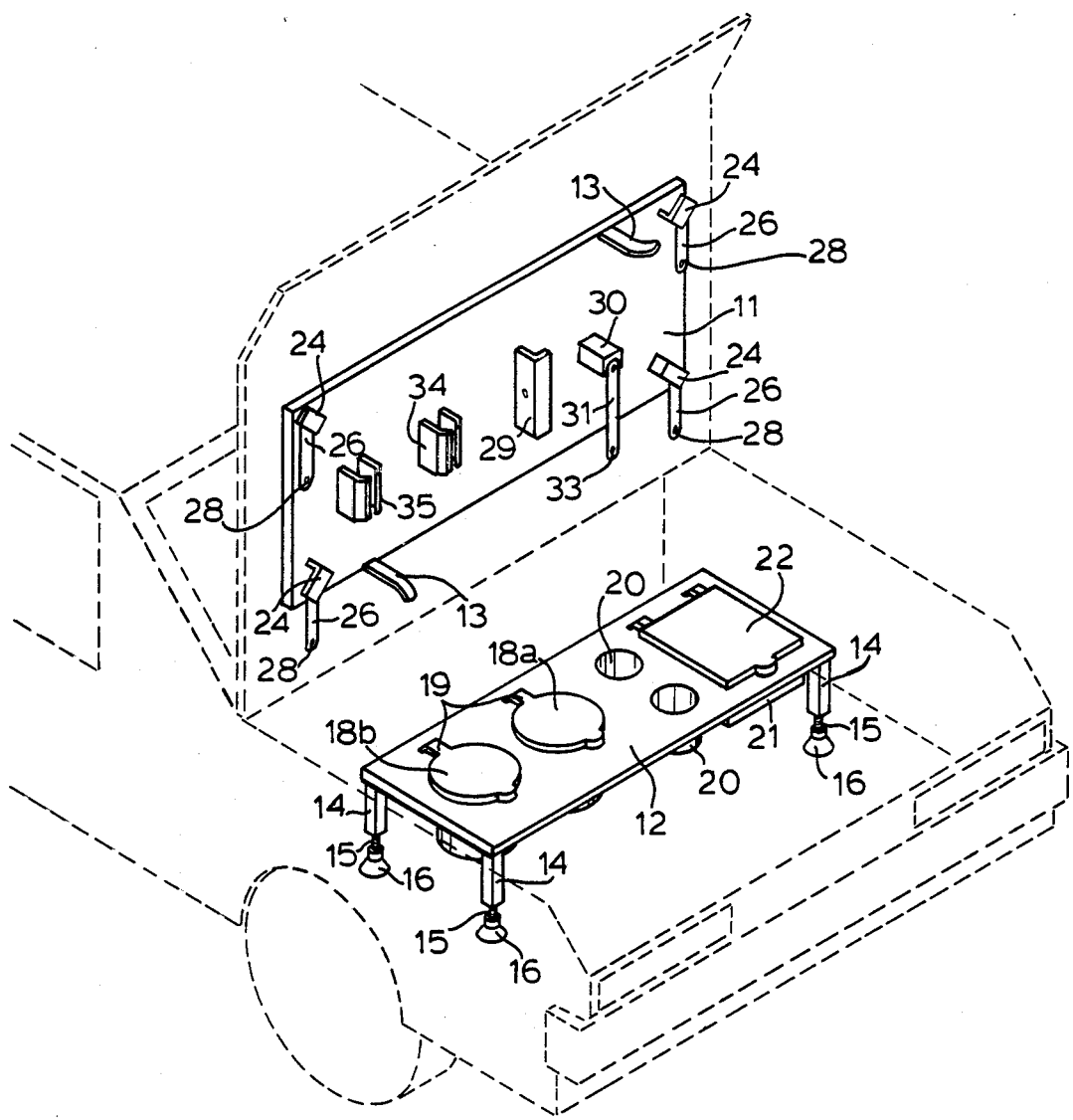
FIG. 1 is a perspective view of an automobile trunk illustrating the preferred embodiment of the present invention.

Referring to FIG. 1, there is shown a trunk organizing unit 10 which consists of a top lid 11 equipped with diagonal flanges 13 that mate with bottom tray 12, upon trunk closure.

Figure 3:
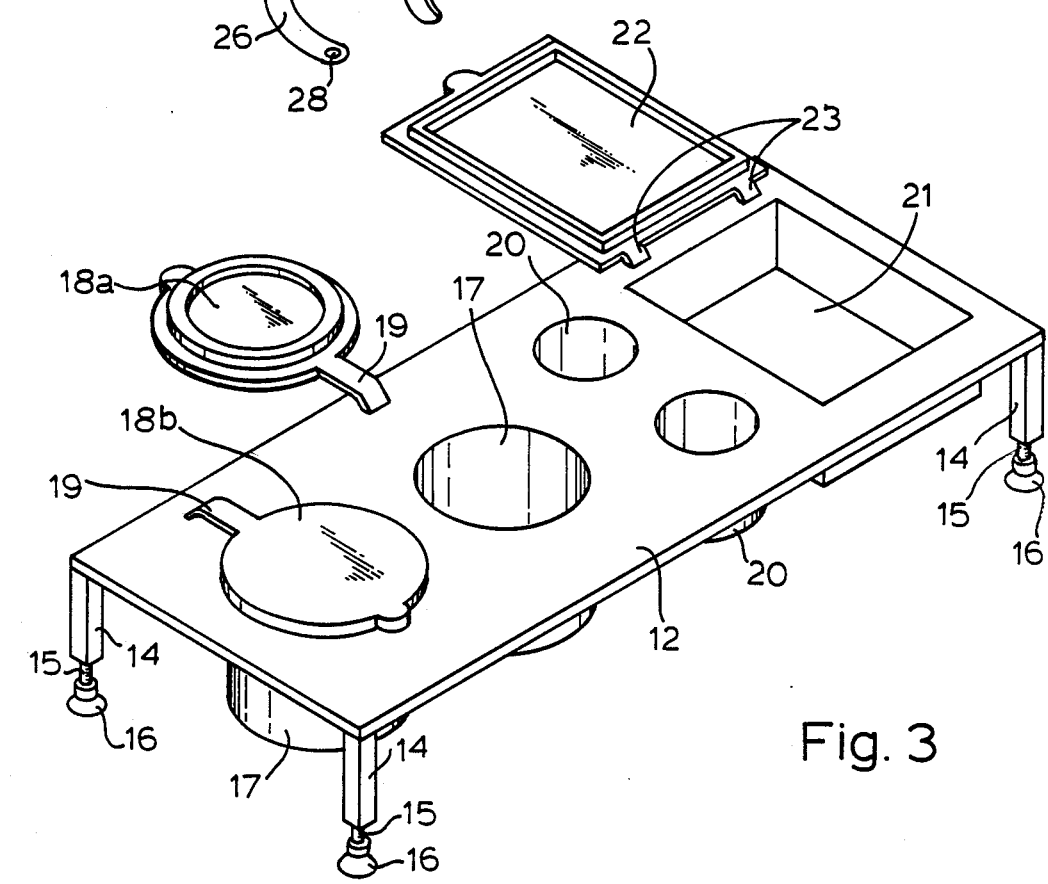
FIG. 3 is a perspective view of the bottom tray member showing the various storage compartments with accompanying lids and adjustable leg means.

As shown in FIGS. 1 and 3, tray 12 is a rectangular shaped member which sets on the trunk floor by means of four height adjustment leg post sleeve 14, each equipped with a threaded cylindrical rod 15 rotated to engage a threaded slot in sleeve 14. Threaded rod 15 has attached to its bottom end, rubber cup discs 16 to provide stable anchoring of tray 12 to the trunk floor.

Bottom tray 12 provides cylindrical compartments 17, each equipped with snap-on lids 18a and 18b and secured to tray 12 by means of band 19. Compartments 17 are afforded for the purpose of storing opened or closed containers of motor oil. Bottom tray 12 is further equipped with smaller cylindrical compartments 20, designed to hold brake fluid, engine additives, carburetor fluids, and the like. Bottom tray 12 is additionally provided with compartment 21 having closure lid 22 secured by bands 23 wherein flashlight, tools, rags, etc. may be stored.

Figure 2:
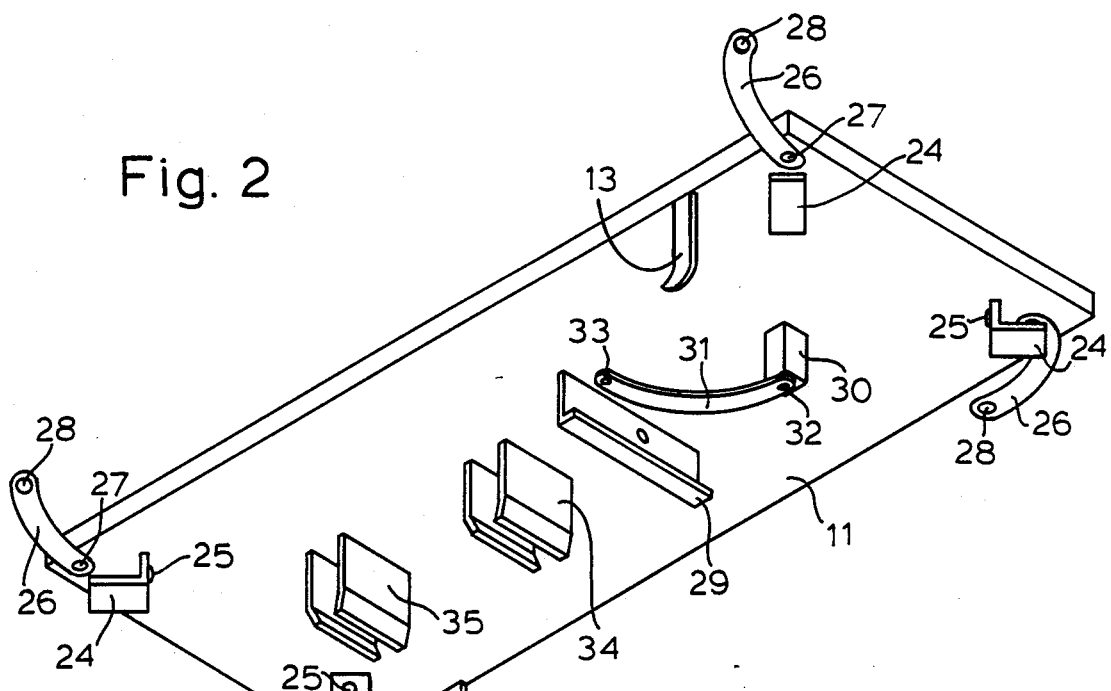
FIG. 2 is a perspective view of the top lid member showing the fixtures for attaching emergency equipment thereto.

Construction of the dimensionally equal top lid 11, as viewed in FIGS. 1 and 2, is similar in construction to its mated bottom tray 12. Rectangular top lid 11 contains hooks 24 equipped with snaps 25 to receive elastic strap 26 which is pivotally mounted at a first end by rivet 27 and detachable secured at a second end by fastener 28 to hook 24 so that said strap 26 and hook 24 encircle and store the battery jumper cables securely to lid member 11. Ridge 29 and post 30 are mounted to lid member 11 at a sufficient separation to enable the positioning of a first-aid kit therebetween. Elastic strap 31 is pivotally attached at a first end by rivet 32 to post 30 and detachably secured to a second end by fastener 33 to ridge 29 so that a first-aid kit may be securely held between ridge 29 and post 30. Flare retaining fixtures 34 and 35 are mounted on top lid member 11 so that each set of fixtures detachably stores two emergency flares for easy accessibility. Top lid 11 is additionally equipped with diagonally disposed flanges 13 which cooperate with the dimensionally equal bottom tray member 12 by sliding over the front and rear edges thereof, securing a perfect alignment of lid 11 with tray 12 when the trunk lid is closed.

As can be envisaged from FIG. 1, such an alignment of lid member 11 with tray member 12 functions with a twofold purpose. First, fixtures 34 and 35 aid in respectively securing lids 18a and 18b, thus, preventing spillage from an open fluid container, this being achieved when lid member 11 is perfectly aligned with tray member 12 and the trunk lid is closed. The second purpose of a perfect alignment of lid member 11 with tray member 12 resides in the height adjustment of tray 12 via threaded rods 15. When the height of tray 12 is adjusted so that fixtures 34 and 35, ridge 29 and post 30 respectively abut lids 18a and 18b, and 22, any occasion for tray member 12 to slide or shift, within the trunk due to automobile motion, is eliminated upon trunk lid closure rendering a snug fit of the organizer.

Figure 4:
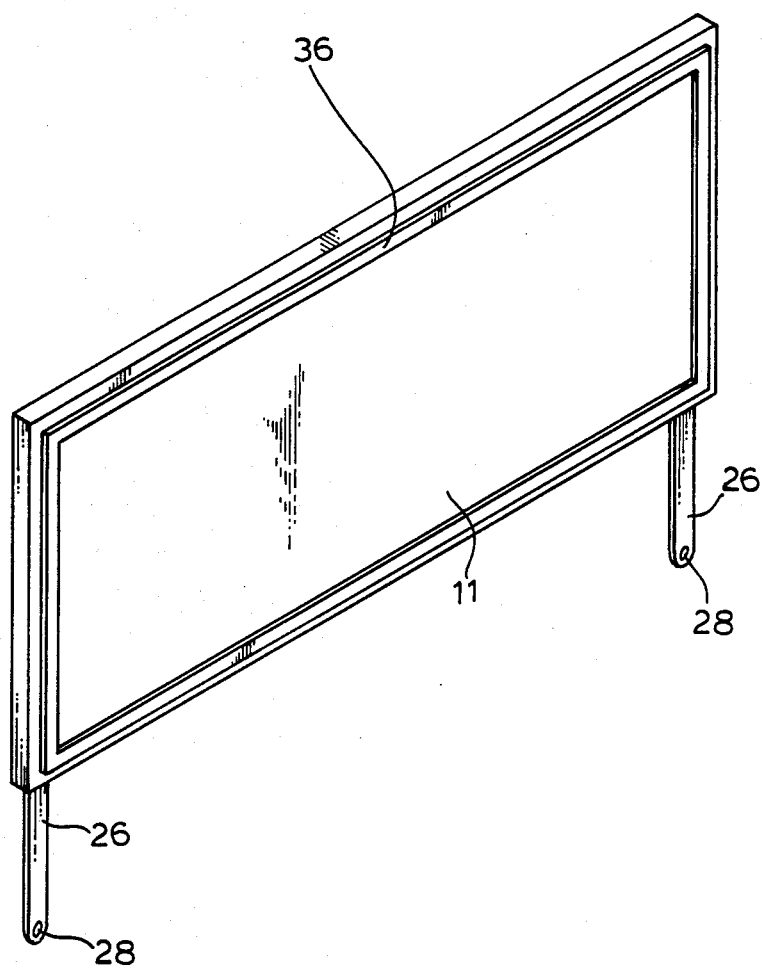
FIG. 4 is a rear elevational view of the top lid shown in FIG. 2 and illustrates the rectangular/magnetic attaching strip for underside trunk lid attachment.
Figure 5:
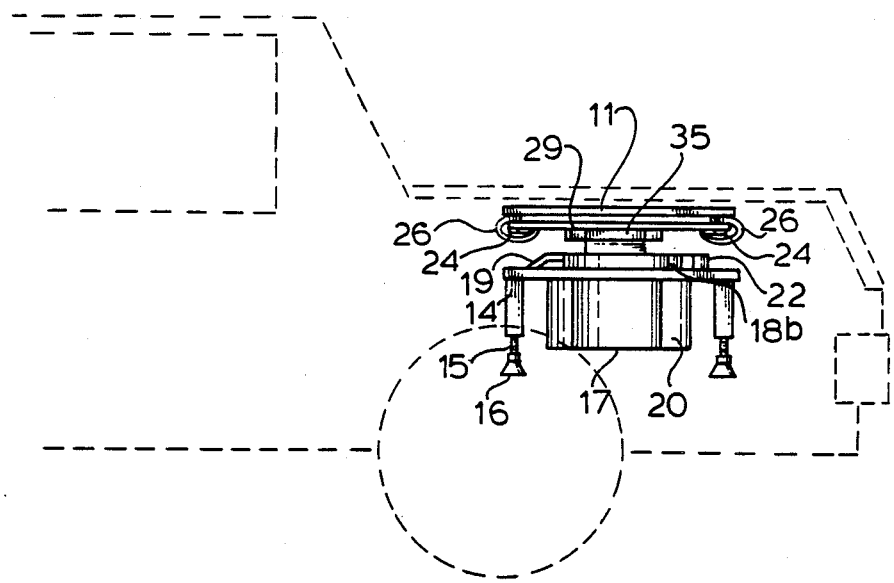
FIG. 5 is a side elevational view of the trunk organizer with top lid and bottom tray in closed alignment with each other.

FIG. 4, which is a rear view of FIG. 2, shows a continuous rectangular/magnetic strip 36 provided for mounting lid 11 to the undersurface of an automobile trunk lid. Lid 11 and tray 12 are preferably molded from a tough, durable plastic material. However, they may be formed from a metal such as aluminum, tin or magnesium alloy, as desired.

The manner of use of the present invention is apparent from the FIGS. 1 to 4. Unit 10 is equipped with the necessary emergency accessories, earlier disclosed, and set on the automobile trunk floor. Tray 12, having lid 11 disposed on the top thereof, is height-adjusted until the trunk lid comfortably mates with the magnetic strip 36, upon closing of the trunk lid. On repeated opening and closing of the trunk lid thereafter, the motorist has obtained a perfect alignment as well as a snug fit of the present inventive unit.

It is to be understood that numerous modifications of the disclosed embodiments of the subject invention will undoubtedly occur to those of skill in the art and the spirit and scope of the invention is to be limited solely in light of the appended claims.

I claim:

1. An automobile trunk organizer for carrying and storing emergency roadside accessories, said organizer comprising a rectangular top lid for mounting to the underside of a trunk lid and having securing means to attach emergency accessories thereto, said organizer having a correspondingly rectangular bottom tray for mounting on a trunk floor, said bottom tray having means for adjusting the height of said bottom tray with respect to said trunk floor, said bottom tray having plural compartment means to contain additional emergency accessories, and said top lid and bottom tray separately and cooperatively abutting each other by adjusting the height of said bottom tray so that the organizer remains stationary when the trunk lid is closed and the automobile is in motion.

2. The automobile trunk organizer of claim 1 wherein the top lid member has a plurality of hooks each mounted adjacent to a corner on the mating side of said lid member, a plurality of straps each pivotally mounted at a first end to a corner of said lid member adjacent to a hook and releasably fastened at a second end to said hook, two fixture sets mounted to the mating side of said lid member, and a ridge and post assembly mounted to the mating side of said lid member for holding emergency roadside accessories.

3. The automobile trunk organizer of claim 1 wherein the bottom tray member has threaded cylindrical rods disposed at each corner thereof for height adjustment of said bottom member, having two large cylindrical compartments open at a first end on the upper side of said tray member and provided with detachable lids thereto while being closed at a second end on the lower side of said tray member, having two small cylindrical compartments open at a first end on the upper side of said tray member and closed at a second end on the lower side of said tray member, and a rectangular compartment open at a first end on the upper side of said tray member and provided with a detachable lid thereto while being closed at a second end on the lower side of said tray member and each compartment provided for holding of emergency roadside accessories.

4. The automobile trunk organizer of claim 2 wherein the top lid member has battery jumper cables encircled around the hooks and secured thereto with adjacent straps, wherein each fixture set is equipped with roadside flares, and wherein the ridge and post assembly contains a first-aid kit.

5. The automobile trunk organizer of claim 3 wherein the bottom tray member contains a can of motor oil in each of the large cylindrical compartments, having a container of brake fluid and carburetor starter in each of the small cylindrical compartments, and having emergency tools and flashlight within the rectangular compartment.

6. An automobile trunk organizer for carrying and storing emergency roadside accessories, said organizer comprising a rectangular top lid mounted on the underside of a trunk lid by means of a continuous rectangular magnetic strip on its topside and having alignment flanges diagonally disposed on the mating side to mate a correspondingly rectangular bottom tray stationed on the trunk floor and having disposed at each under side corner thereof threaded cylindrical rods cupped with rubber discs said rods enabling the motorist to adjust the height of the bottom tray to align and abut with the mating top lid to prevent fluid spillage and organizer movement when the trunk lid is closed and the automobile is in motion.

* * * * *